A. MARINO.
SPINTHEROMETER FOR RADIOTELEGRAPHIC PLANTS.
APPLICATION FILED DEC. 20, 1917.
1,328,288.  Patented Jan. 20, 1920.
8 SHEETS—SHEET 1.
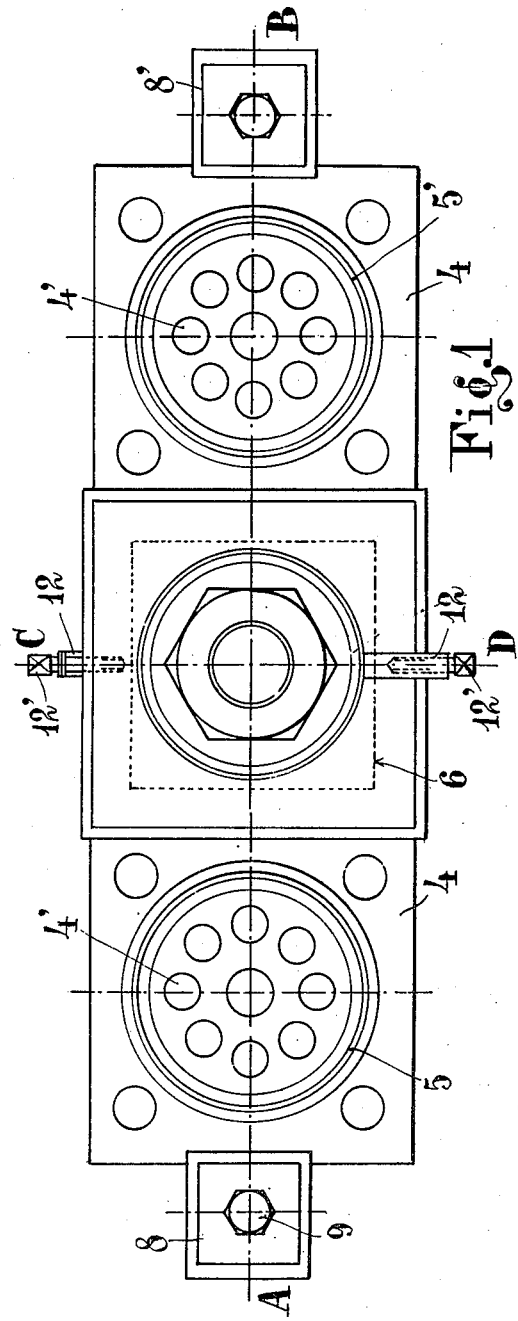
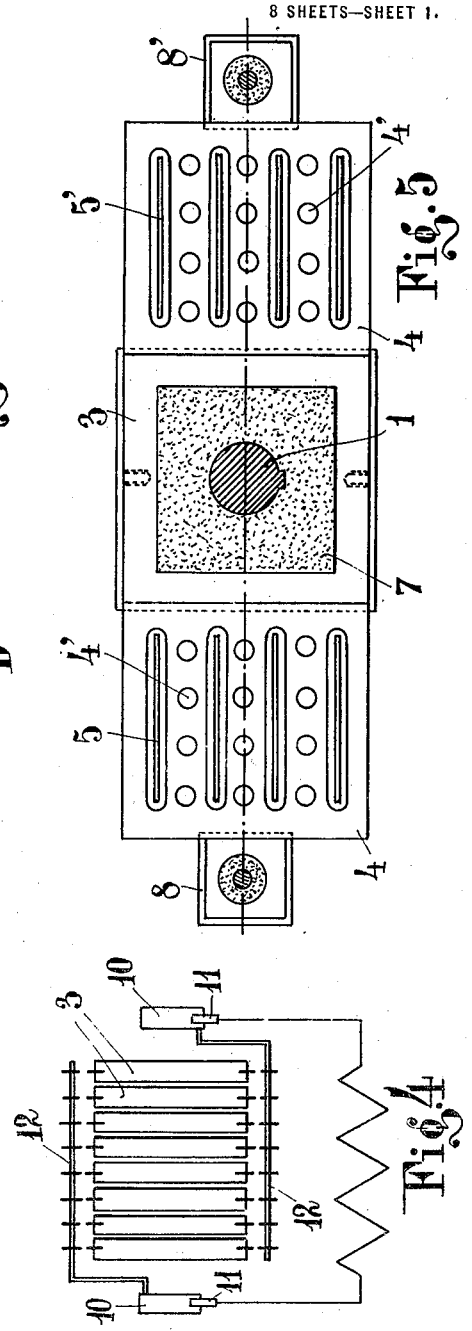
Algeri Marino
Inventor A. MARINO.
SPINTHEROMETER FOR RADIOTELEGRAPHIC PLANTS.
APPLICATION FILED DEC. 20, 1917.

1,328,288.

Patented Jan. 20, 1920.
8 SHEETS—SHEET 2.

Inventor:
Algeri Marino
By Lawrence Langner
Attorney.

A. MARINO.
SPINTHEROMETER FOR RADIOTELEGRAPHIC PLANTS.
APPLICATION FILED DEC. 20, 1917.

1,328,288.

Patented Jan. 20, 1920.
8 SHEETS—SHEET 3.

Algeri Marino
Inventor

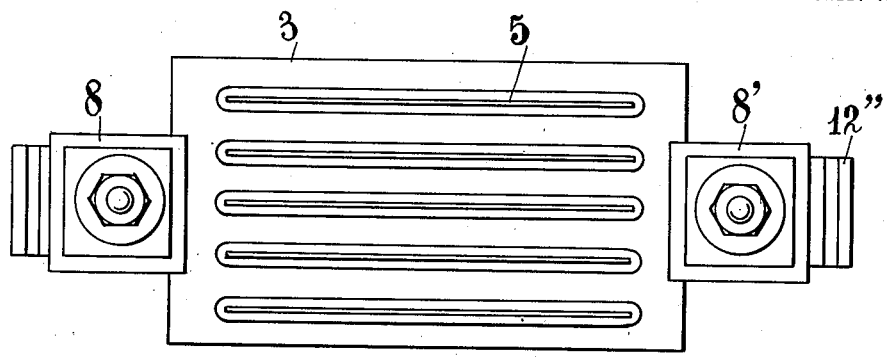
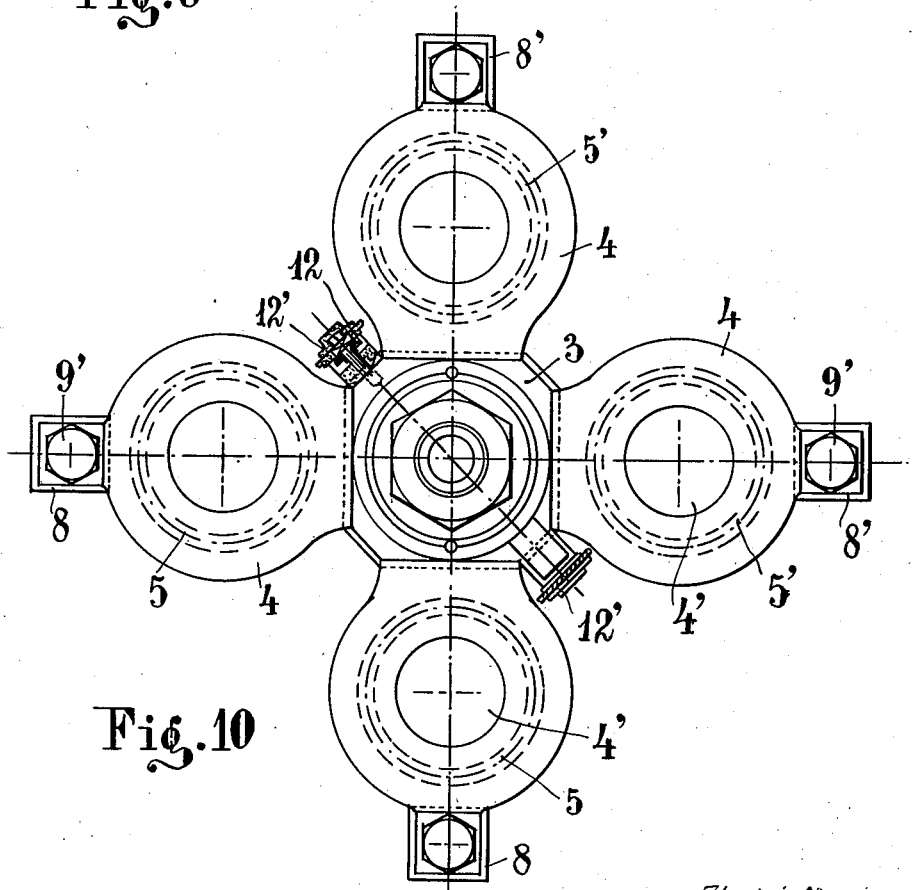

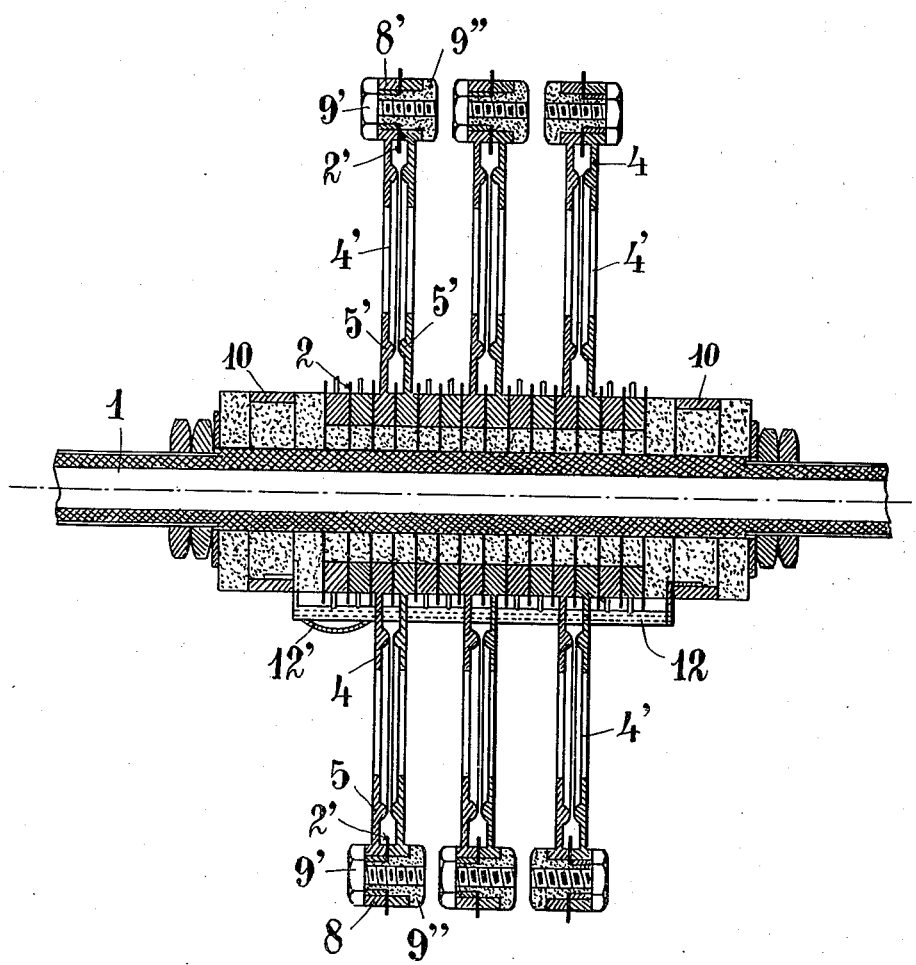

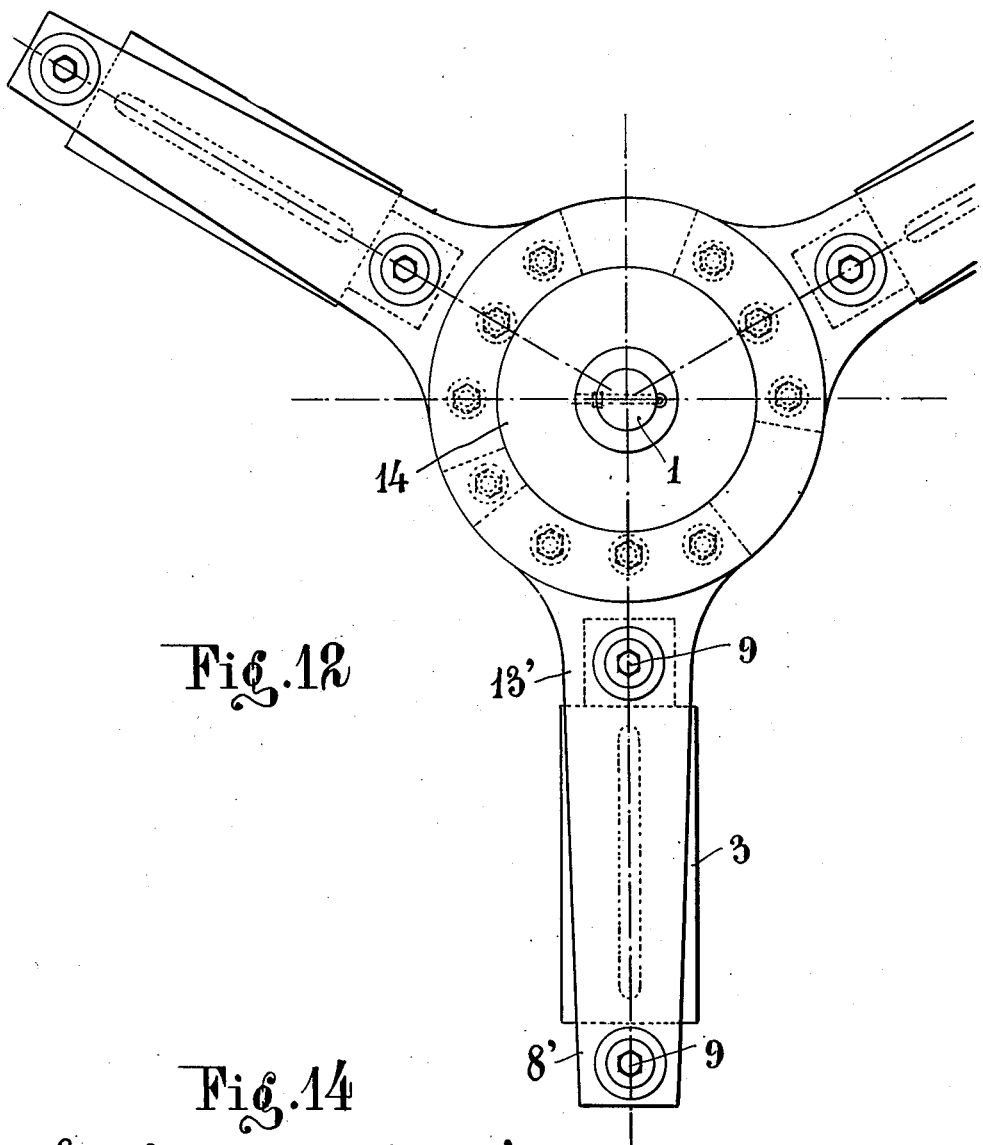

A. MARINO.
SPINTHEROMETER FOR RADIOTELEGRAPHIC PLANTS.
APPLICATION FILED DEC. 20, 1917.
1,328,288.
Patented Jan. 20, 1920.
8 SHEETS—SHEET 8.
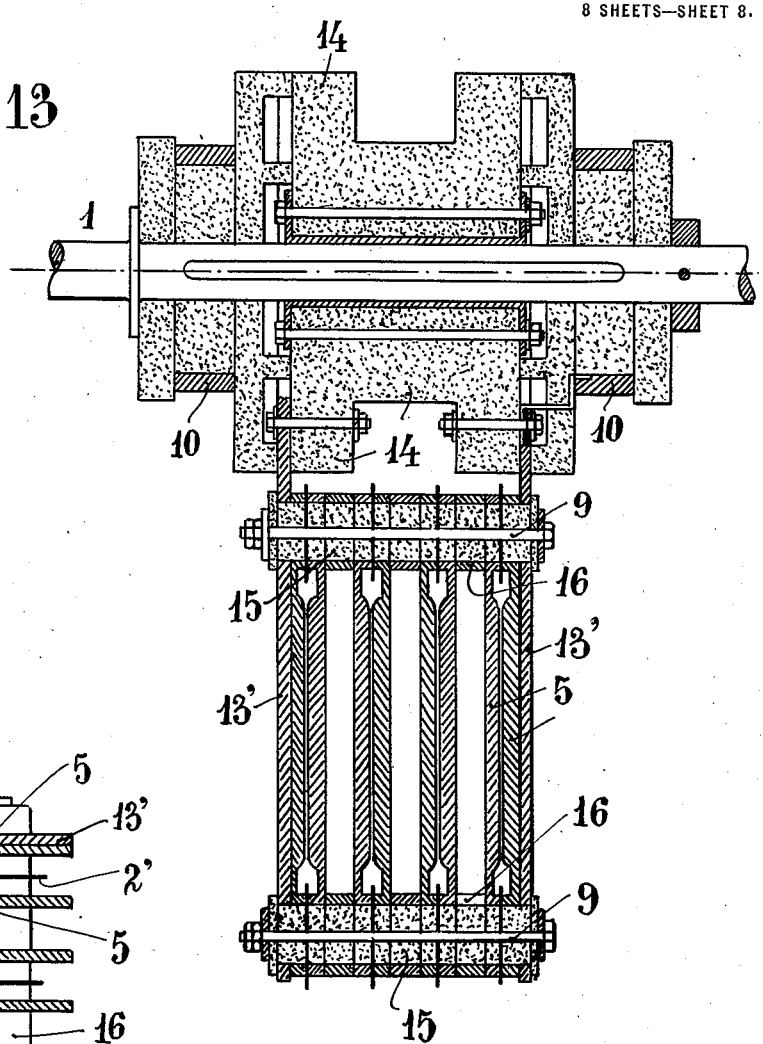
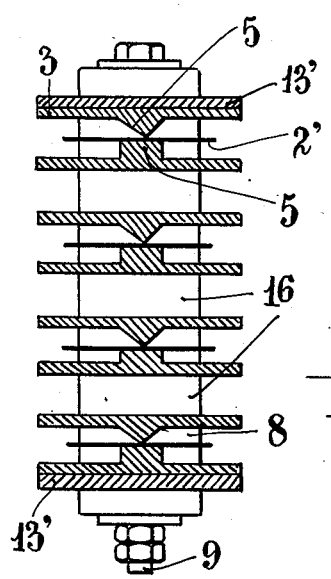
Algeri Marino
Inventor
Attorney.

UNITED STATES PATENT OFFICE.

ALGERI MARINO, OF VENICE, ITALY.

SPINTHEROMETER FOR RADIOTELEGRAPHIC PLANTS.

1,328,288.            Specification of Letters Patent.      Patented Jan. 20, 1920.

Application filed December 20, 1917. Serial No. 208,057.

*To all whom it may concern:*

Be it known that I, ALGERI MARINO, subject of the King of Italy, and resident of Venice, Italy, have invented certain new and useful Improvements in Spintherometers for Radiotelegraphic Plants, of which the following is a specification.

In radiotelegraphic plants utilizing, for the production of the electro-magnetic waves, the oscillatory discharge of the condensers, one of the more delicate parts which in most cases serves to differentiate the various systems, is the spintherometer.

It is known that in ordinary radiotelegraphic plants, when no special means are provided, the primary oscillatory circuit and the open circuit of the antenna, coupled with each other by means of Tesla or Oudin transformers, are the seat of two oscillations having a frequency respectively higher or lower than the frequency with which the two circuits have been previously tuned. To eliminate this drawback which causes a considerable loss of energy, as only one of the two coupling waves may be utilized, the coupling of the two circuits must be very weak, but in this case the energy transmitted to the antenna is reduced and consequently the efficiency of the plant is very low.

To this end it is preferable to use the Wien's method which is called method of impulsive excitation or method of excitation by shock.

But such an excitation by shock requires the spintherometer to have special properties, that is the oscillations taking place in the primary oscillatory circuit must be quickly damped in order that said oscillations are interrupted as soon as the energy of the primary circuit has been transmitted to the secondary one, any return of energy from the secondary to the primary being prevented.

Consequently one of the essential conditions required for realizing the excitation by shock resides in the fact that the spintherometric space loses its residual conductivity as soon as the discharge has taken place, the primitive resistance of said space being quickly restored.

Almost all of the spintherometers of this type now constructed are based on the Wien's method consisting in the fact that the electrodes have a very large surface with regard to the distance between them. The shorter the spark is, the better will be the damping of the same, the experiences of Rempp having shown that extremely short sparks (having say a few tenths of millimeter length) have a strong resistance and consequently give rise to oscillations quickly damped.

The sparks may also be damped: (1) by assisting the dissipation of the heat from the points in which the discharge takes place; (2) by an energetic cooling reducing to a minimum the quantity of heat in the proximity of the electrodes and (3) by means allowing the spark to take place in cold points.

The spintherometers constructed to this end by Van Bepel, by the Telefunken and by S. F. R. are known, but all these types, even if satisfactory for little or medium power plants, are insufficient for large plants.

According to this invention, the above stated requirements are met and a satisfactory operation, even in case of large plants, is insured by the fact that the spintherometer is constituted of a plurality of plates provided with electrodes of annular, rectilinear or other shape, said electrodes having such a position that they are open on all sides, the above stated plates being clamped together and having their corresponding electrodes in front of and at a distance from each other of say a few tenths of a millimeter.

The invention comprises also means assisting a quick cooling of the electrodes, said means consisting in arranging the plates in the pile and in mounting said pile so as to rotate about an axis perpendicular to the plates, and further comprises, in the particular case of the use of a direct current generator, the unsymmetrical constitution of the corresponding electrodes, these electrodes having different shapes or being made of different materials.

In the annexed drawings several constructions of spintherometers according to the invention are shown by way of example, and Figure 1 is a side view of a first type, Fig. 2 shows the longitudinal vertical section on the line A—B of Fig. 1, Fig. 3 is the transverse vertical section on the line C—D of Fig. 1;

Fig. 4 shows diagrammatically the circuit;

Fig. 5 shows a modified form of the plates;

Figure 6:
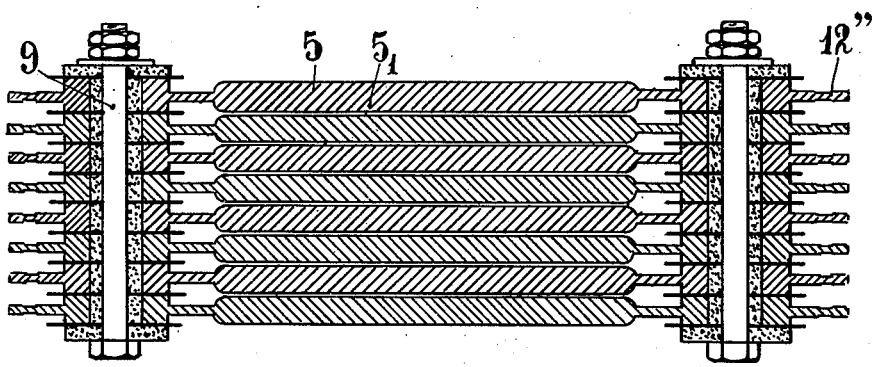
Figure 7:
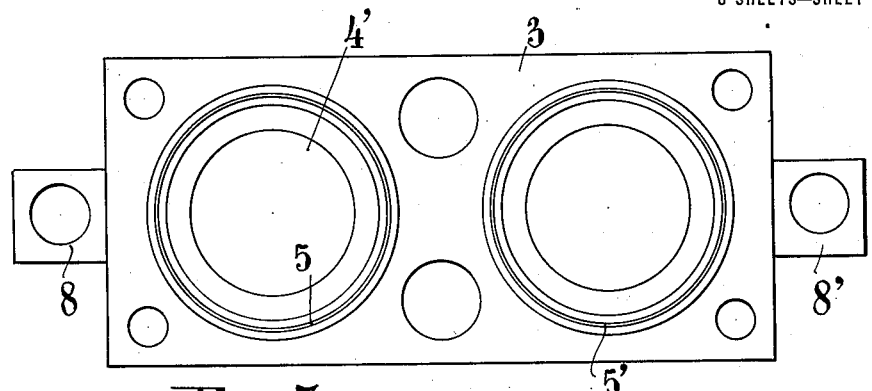
Figure 8:
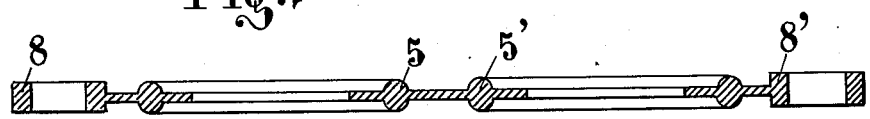
Figure 9:
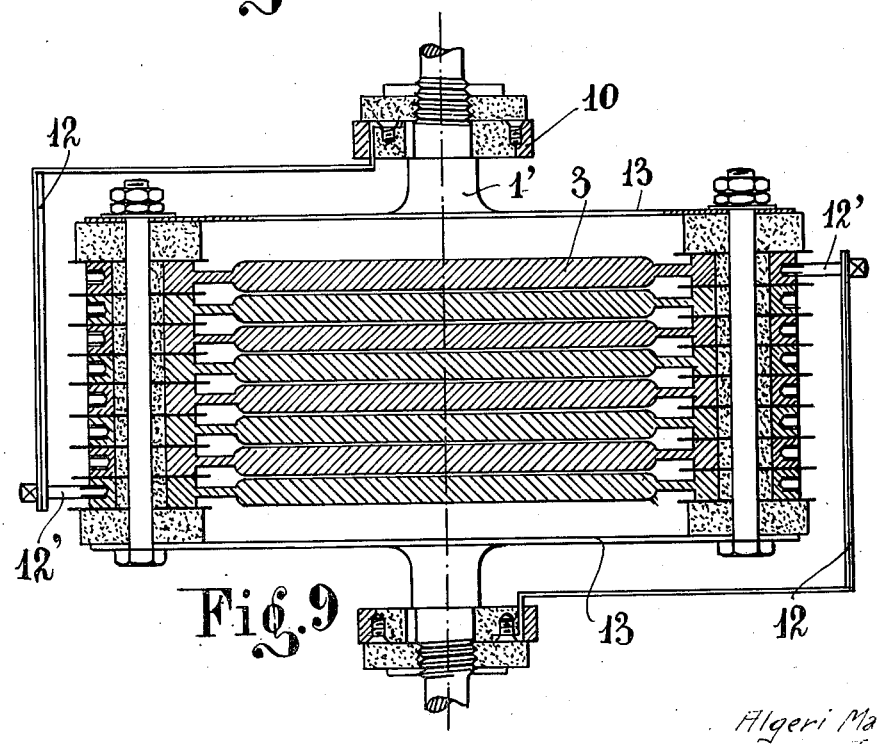

Figs. 6 and 6ᵃ are respectively the longitudinal vertical section and the side view of a spintherometer of stationary type;

Figs. 7 and 8 are respectively the side view and the longitudinal vertical section of a plate;

Fig. 9 is the longitudinal vertical section of a spintherometer according to Fig. 6 but adapted to be rotated;

Fig. 10 is the side view and Fig. 11 the axial vertical section of a spintherometer having the adjacent pairs of plates arranged at right angles to each other;

Fig. 12 shows the side view of a spintherometer comprising a plurality of plate piles mounted on a rotary member and Fig. 13 is a partial section of the same through the axis of the rotating member and the longitudinal axis of a plate pile;

Fig. 14 shows the plates of the spintherometer according to Figs. 12 and 13, and Fig. 15 is the transverse section of a plate pile in which the facing electrodes have a different shape.

Figure 2:
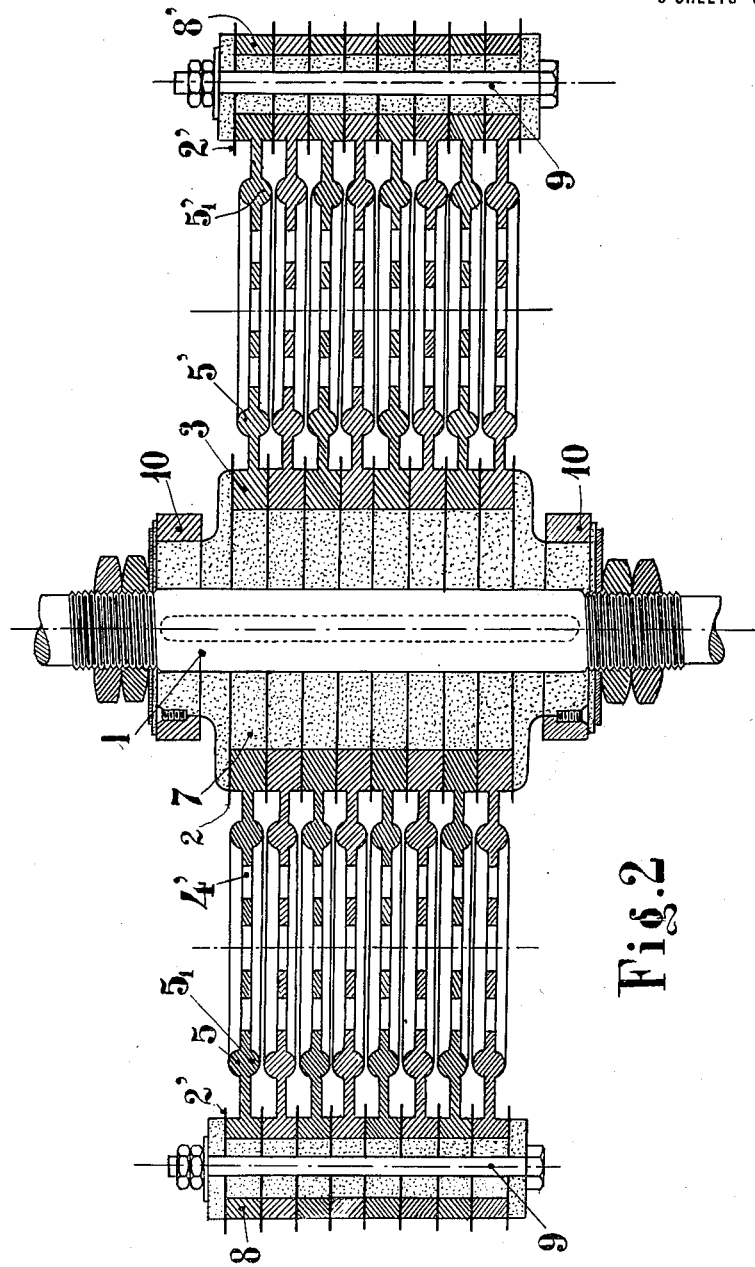
Figure 3:
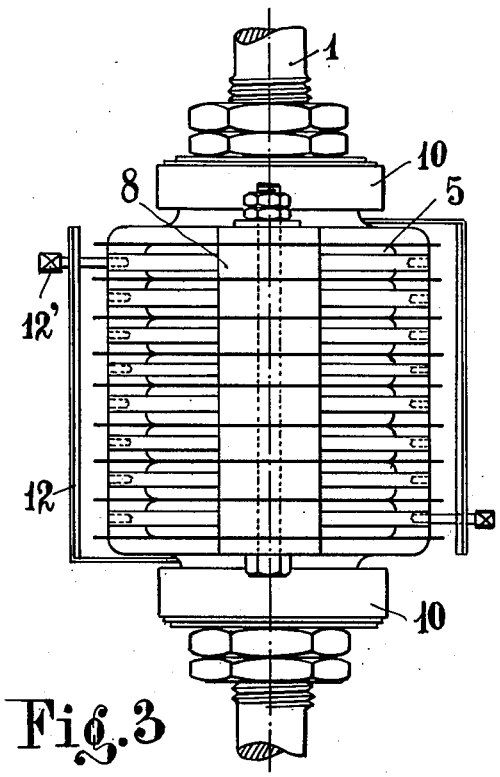

In the construction shown in Figs. 1 to 3 the spintherometer comprises a number of rectangular plates mounted on a spindle 1 and spaced apart from each other by insulating sheets 2' which may be made of mica, having a thickness of a few tenths of a millimeter. Each plate (Fig. 2) comprises a central portion 3 of uniform thickness and thinner side portions 4', provided at their faces with two rings 5, 5" having semicircular section and the same height of the central plate portion. The portion of the plate which is comprised within said rings is pierced by holes for the free passage of the air. At the same place occupied by the rings 5 and 5" the plate bears on its opposite face two rings $5_1$ and $5'_1$ the height of which corresponds to the height of the central portion of the plate.

The rings 5—5'—$5_1$—$5'_1$ constitute the electrodes which, when the spintherometer is mounted, register with the electrodes of the facing plates leaving a space between them corresponding to the thickness of the sheet of mica 2. In the central portion of each plate is provided a rectangular opening 6 filled with a piece 7 of insulating material as ebonite, having the same thickness as the central portion of the plate; this piece in turn is provided with an opening through which passes the spindle 1 which is solid with said pieces by means of a recess and a corresponding projection or by said openings and spindle being square in section. By this way it is possible to impart to said spindle a rotation without any relative displacement of the electrodes which are always in front of each other. In order to prevent variations in the distance between the electrodes during the rotation of the spintherometer, each plate bears at its ends two extensions 8 and 8' having the same thickness as the central portion 3 and provided with a square or circular opening occupied by a piece of insulating material which in turn is bored for giving passage to a bolt 9. The extensions 8 and 8' are spaced from the corresponding extensions of the adjacent plate by sheets 2' of insulating material, as mica. The plates when superposed are clamped together by means of nuts screwed on the ends of the central spindle 1 and bolts 9. These nuts are insulated from the plates by means of insulating washers. At each end the spindle 1 is provided with a metallic ring 10 carefully insulated from the spindle and on said rings bear two brushes 11 connected with the ends of the secondary winding of the transformer of the feeding circuit (Fig. 4). Connected with said rings are two conducting bars 12, for example of copper, which extend longitudinally of and at a distance from said plate pile, these bars being provided with holes each registering with one plate and adapted to receive a pin 12' by means of which the electric connection with the corresponding plate may be effected (Fig. 3).

It is evident that with a spintherometer as described in lieu of a single spark, a plurality of sparks in series is obtained and that their number may be adjusted by varying the position of the pins 12' in the bars 12 in such a manner that the desired number of plates may be inserted between said pins.

As shown in Fig. 4, when say five sparks in series are to be obtained, the pins 12' must be inserted in the holes corresponding to two points between which four plates are comprised.

By the described construction of the spintherometer an exact adjustment of the apparatus may be obtained and the sparks are obtained on the edges of the electrode plates, so that it is possible to perceive the moment in which the action by shock takes place by observing the color of said sparks. Further the large surface of each plate causes a quick and efficient cooling of the electrodes this cooling being assisted by the electrodes being open on all sides.

By imparting to the spintherometer a rotation, the dielectric existing in the spintherometric space is continuously renewed and consequently the sparks are quickly damped and the primitive conditions of the spintherometric space are quickly restored.

The plates may be modified by giving to the electrodes 5 and 5' instead of the annular shape, the shape of bars (as shown in Fig. 5) which may be longitudinally or transversely arranged on the plates, each bar being limited by a semicylindrical surface with round ends and having the same height as the central portion of the plate. The field between the electrodes is uniform as in the case of annular electrodes, and the circulation of air is assisted by holes 4' made in the plates between the bars of each plate.

For high power plants, in lieu of plates bearing the electrodes at their two sides, plates may be used comprising a central portion and four or more side extensions symmetrically arranged and fitted with the electrodes. By this construction the surface of the electrodes is increased in a rational manner the conditions realized in the construction according to the Fig. 1 being satisfied for each electrode.

It is evident that the described spintherometer may also be of the stationary type in which case it may be simplified as shown in Figs. 6 and 7 and 8 in which the plates are spaced from each other by two sheets of mica inserted between the end pieces 8 and 8' and are assembled together by insulated bolts, the desired number of plates being inserted in the oscillatory circuit by means of contacting pieces (not shown) connected with the generator and adapted to engage the edges 12'' of the plates (Figs. 6 and 6ª).

Alternatively the spintherometer according to the Fig. 6 may be transformed in a spintherometer of rotating type by disposing the pile of plates 3 between two heads 13 provided with coaxial pins 1' as shown in Fig. 9. In the construction according to Figs. 10 and 11 the plates 3, constructed as shown in Fig. 1, are fitted with annular electrodes 5 and 5' on a single face and are assembled by pairs with their electrodes in front of and spaced apart from each other by insulating sheets 2, 2' inserted between the central portions 3 and end pieces 8 and 8'. Each pair of plates forms a right angle with regard to the adjacent one so that the electrodes are arranged circumferentially with respect to the spindle 1 on which the several plates are mounted in the described manner. The space between the plates is larger and cooling of the same is made more efficient. In this case the lateral portions 4 of the plates have a rounded shape (Fig. 10) and the corners of the central portion 3 are cut away in order to leave the space for arranging the metallic insulated bars 12 having holes in which screws 12' are screwed in order to allow of modifying the number of elements inserted in the circuit.

The plates may also have a single side extension fitted up with an electrode 5 or 5', each pair of said plates having their electrodes in front of each other and being arranged at an angle of 90° with regard to the adjacent pair.

This case is shown in Fig. 10 assuming that each extension 4 belongs to a different pair of plates. In this case the free intervals are still larger and the cooling is further assisted.

Fig. 11 shows the end coupling of the plates effected for each pair by means of a bolt 9' of insulating material screwed in an insulating plug arranged in the hole of the end piece 8 or 8'.

The ends of the pairs having the same arrangement in the radial direction may also be assembled by means of a single bolt by inserting between said adjacent pairs spacing pieces of insulating material.

The pile of plates bearing the electrodes may be caused to rotate about an axis not passing through the center of the plates. Such an arrangement is realized by mounting said pile between two insulating heads bearing the pins at one of their ends. In order to balance the rotating member, it is advisable that two or more piles of plates are mounted symmetrically with respect to the axis of rotation.

This construction is shown in Figs. 12 and 13 in which on the spindle 1 is keyed a hub 14 of insulating material to which the spokes 13' are secured; between said spokes and at the periphery of the rotating member are fastened, by means of bolts 9, three piles of plates 3 the longitudinal axis of which radiate from the rotation axis.

Each plate is fitted up with electrodes on a single face and the pairs are spaced apart from each other by a free interval.

For the plates to be used in this construction any one of the described types may be adopted and they may be fitted up with electrodes of annular or straight shape. Fig. 14 shows for example a rectangular plate having a single straight electrode 5 and provided with end pieces 8 and 8' each having a hole in which an insulating ring is placed. The pairs of plates 3 are superposed as shown in Fig. 13, a space between them being provided by means of spacing pieces arranged on said rings; said spacing pieces are formed by a ring 15 of insulating material arranged in a ring 16 of conducting material in order to connect electrically two adjacent plate pairs, and in the hole of the pile so formed passes the bolt 9 by means of which the plates are connected by clamping them together between the spokes 13'.

On the spindle 1, in front of the hub 14 are arranged two conducting rings 10 each electrically connected with a plate pile, and thus said piles may be put either in series or in parallel or in series-parallel by suitably connecting their end plates.

Of course the construction shown in Figs. 12 and 13 having plates provided with electrodes on a single face and with the plates spaced apart from each other by means of spacing pieces may be applied to spintherometers of both stationary or rotating types according to Figs. 1 to 9, in order to assist the circulation of air between the plates and consequently their cooling.

In the described spintherometer the material of which the electrodes are formed constitutes an essential feature; generally they must be of silver or silver plated copper.

Obviously these types of spintherometers may be used in connection with generators of either alternating or direct current. In this latter case, by regulating the characteristics of the feeding circuit in such a manner to have in the spintherometer a very close series of discharges, it is easy to produce continuous waves.

When using direct current generators it may be advisable to make the electrodes unsymmetrical in respect of their material or of their shape; for example in the case of plates according to the Fig. 14 with electrodes of straight shape, the corresponding electrodes may be made of prismatic bars having respectively triangular and rectangular section. In this case when several pairs of plates are superposed in series, the succession must be the following: plate with triangular bar—plate with rectangular bar—plate with triangular bar—plate with rectangular bar and so on, as shown in Fig. 15.

What I claim as my invention and desire to secure by United States Letters Patent is:

1. A spintherometer comprising a series of superposed plates, a thick portion in each plate, a thin portion adjacent to the thick portion, said thin portion being formed with holes, ribs on said thin portion to form electrodes, the electrodes being of the same thickness as the thick portion, another thick portion at the opposite end of said thin portion, insulating setting pieces between the thick portions of two adjacent plates to hold the corresponding electrodes at proper distance, means in said thick portions for assembling the plates and means for inserting the electrodes in a circuit.

2. A spintherometer comprising a series of superposed plates, a thick portion in each plate, thin portions formed with holes, said thin portions being adjacent to the thick portion, ribs on said thin portions to form electrodes, the electrodes being of the same thickness as the thick portion, a thick portion at the opposite end of each thin portion, insulating setting pieces between the thick portions of the adjacent plates to hold the corresponding electrodes at proper distance, means in said thick portions for assembling the plates, and means for inserting the electrodes in a circuit.

3. A spintherometer comprising a series of superposed plates, thick portions in each plate, a thin portion between two thick portions, said thin portion being formed with holes, a rib on said thin portion to form an electrode, the top of the electrode being of the same thickness as the thick portions, insulating setting pieces between the thick portions of two adjacent plates to hold the corresponding electrodes at proper distance, means in said thick portions for assembling the plates and means for inserting the electrodes in a circuit.

4. A spintherometer comprising a series of superposed plates, each having an elongated shape, thick portions in each plate, a thin portion between two thick portions, said thin portion being formed with holes, ribs on said thin portion to form electrodes, the electrodes being of the same thickness as the thick portions, insulating setting pieces between the thick portions of the two adjacent plates to hold the coacting electrodes at proper distance, means in said thick portions for assembling the plates and means for inserting the electrodes in a circuit.

5. A spintherometer comprising a series of superposed plates, thick portions in each plate, a thin portion between two thick portions, said thin portion being formed with holes, ribs on one surface of said thin portion to form electrodes, the ribs of two adjacent plates facing each other, the electrodes being of the same thickness as the thick portion, insulating setting pieces between the thick portions of two adjacent plates to hold the corresponding electrodes at proper distance, means in said thick portions for assembling said two plates, setting pieces between each pair of plates adapted to separate the surfaces not provided with ribs forming electrodes, means for assembling together the pairs of plates and means for inserting the electrodes in a circuit.

6. A spintherometer comprising a series of superposed plates, thick portions in each plate, a thin portion between two thick portions, said thin portion being formed with holes, ribs on said thin portion to form electrodes, the electrodes being of the same thickness as the thick portions, the ribs of adjacent plates facing each other, the opposite ribs having different cross-section, insulating setting pieces between the thick portions of two adjacent plates to hold the corresponding electrodes at proper distance, means in said thick portions for assembling the plates and means for inserting the electrodes in a circuit.

7. A spintherometer comprising a series of superposed plates, thick portions in each plate, a thin portion between two thick portions, said thin portion being formed with holes, ribs on said thin portion to form electrodes, the electrodes being of the same thickness as the thick portions, the ribs of adjacent plates facing each other, the opposite ribs being of different material, insulating setting pieces between the thick portions of two adjacent plates to hold the corresponding electrodes at proper distance, means in said thick portions for assembling the plates and means for inserting the electrodes in a circuit.

8. A spintherometer comprising a series of superposed plates, thick portions in each plate, a thin portion between two thick portions, said thin portion being formed with holes, ribs on said thin portion to form electrodes, the electrodes being of the same thickness as the thick portions, insulating setting pieces between the thick portions of two adjacent plates to hold the corresponding electrodes at proper distance, means in said thick portions for assembling the plates, means for mounting the pile of plates rotatably about an axis perpendicular to the plates and means for inserting the electrodes in a circuit.

9. A spintherometer comprising a series of superposed plates, thick portions in each plate, a thin portion between two thick portions, said thin portion being formed with holes, ribs on said thin portion to form electrodes, the electrodes being of the same thickness as the thick portions, insulating setting pieces between the thick portions of two adjacent plates to hold the corresponding electrodes at proper distance, means in said thick portions for assembling the plates to form a pile of plates rotatable about an axis perpendicular to the plates said means external to the thin portions of each plate and means for inserting the electrodes in a circuit.

10. A spintherometer comprising a series of superposed plates, thick portions in each plate, a thin portion between two thick portions, said thin portion being formed with holes, ribs on said thin portion to form electrodes, the electrodes being of the same thickness as the thick portions, insulating setting pieces between the thick portions of two adjacent plates to hold the corresponding electrodes at proper distance, means in said thick portions for assembling the plates to form a pile of plates, a rotary member about the axis of which the pile of plates is mounted and means for inserting the electrodes in a circuit.

11. A spintherometer comprising a series of superposed plates, thick portions in each plate, a thin portion between two thick portions, said thin portion being formed with holes, ribs on said thin portion to form electrodes the top of the electrodes being of the same thickness as the thick portions, insulating setting pieces between the thick portions of two adjacent plates to hold the corresponding electrodes at proper distance, means in said thick portions for assembling the plates, a rotary member of insulating material in which several groups of plates are symmetrically mounted and means for inserting the electrodes in a circuit.

12. A spintherometer comprising a series of superposed plates, thick portions in each plate, a thin portion between two thick portions, said thin portion being formed with holes, ribs on said thin portion to form electrodes, the top of the electrodes being of the same thickness as the thick portions, insulating setting pieces between the thick portions of two adjacent plates to hold the corresponding electrodes at proper distance, means in said thick portions for assembling the plates to form a pile of plates rotatable about an axis perpendicular to the plates, two conducting rings mounted on a rotary member and connected with the plates and two brushes contacting with said rings and inserted in a circuit.

Signed at the U. S. consulate at Venice, in the Province of Venezia and Kingdom of Italy this 7 day of August 1917.

ALGERI MARINO.